(12) United States Patent
Bodiya et al.

(10) Patent No.: US 11,726,319 B2
(45) Date of Patent: Aug. 15, 2023

(54) DISPLAYS AND METHODS OF OPERATING THEREOF

(71) Applicant: GOOGLE LLC, Mountain View, CA (US)

(72) Inventors: Timothy Paul Bodiya, Toronto (CA); Shreyas Potnis, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 646 days.

(21) Appl. No.: 16/737,255

(22) Filed: Jan. 8, 2020

(65) Prior Publication Data
US 2020/0225468 A1    Jul. 16, 2020

Related U.S. Application Data

(60) Provisional application No. 62/791,514, filed on Jan. 11, 2019.

(51) Int. Cl.
| | |
|---|---|
| *G02B 27/00* | (2006.01) |
| *G06F 1/16* | (2006.01) |
| *F21V 8/00* | (2006.01) |

(52) U.S. Cl.
CPC ....... *G02B 27/0081* (2013.01); *G02B 6/0023* (2013.01); *G06F 1/163* (2013.01)

(58) Field of Classification Search
CPC ............ G02B 27/0081; G02B 27/0172; G02B 6/0023; G06F 1/163; G06F 3/011
See application file for complete search history.

(56) References Cited

U.S. PATENT DOCUMENTS

| | | | | |
|---|---|---|---|---|
| 2006/0238877 A1* | 10/2006 | Ashkenazi | ......... | G02B 27/0093 359/630 |
| 2013/0063815 A1* | 3/2013 | Kubota | ................ | G02B 27/017 359/464 |
| 2019/0270845 A1* | 9/2019 | Ullah | .................... | C25B 11/075 |

\* cited by examiner

*Primary Examiner* — Darryl J Collins
*Assistant Examiner* — Vipin Patel

(57) ABSTRACT

There is provided a method of operating a wearable heads-up display (WHUD), which method includes generating first and second lights having respectively first and second wavelengths within about 50 nm of one another. The method also includes directing the first and second lights onto an incoupler of a display optic of the WHUD along first and second ranges of input angles respectively. The first and second ranges of input angles correspond to positions of pixels of first and second portions of an image to be displayed by the WHUD. The incoupler has first and second angular bandwidths corresponding to the first and second wavelengths respectively. A combination of the first and second ranges of input angles is larger than each of the first and second angular bandwidths. Moreover, the method includes directing the first and second lights into a field of view of a user to form the image.

14 Claims, 11 Drawing Sheets

100

Generating, by a light source of a wearable heads-up display (WHUD), a first light having a first wavelength and a second light having a second wavelength, the first wavelength being within about 50 nm of the second wavelength

105

Directing the first light by a spatial modulator of the WHUD onto an incoupler of a display optic of the WHUD along a first range of input angles relative to the incoupler, the incoupler to direct the first light into the display optic, wherein: the first range of input angles corresponds to positions of pixels of a first portion of an image to be displayed by the WHUD; and the incoupler has a first angular bandwidth corresponding to the first wavelength and a second angular bandwidth corresponding to the second wavelength

110

Directing the second light by the spatial modulator onto the incoupler along a second range of input angles relative to the incoupler, the incoupler to direct the second light into the display optic, wherein: the second range of input angles corresponds to positions of pixels of a second portion of the image to be displayed by the WHUD; and a combination of the first range of input angles and the second range of input angles is larger than the first angular bandwidth and larger than the second angular bandwidth

115

Directing, by the display optic, the first light and the second light into a field of view of a user to form the image

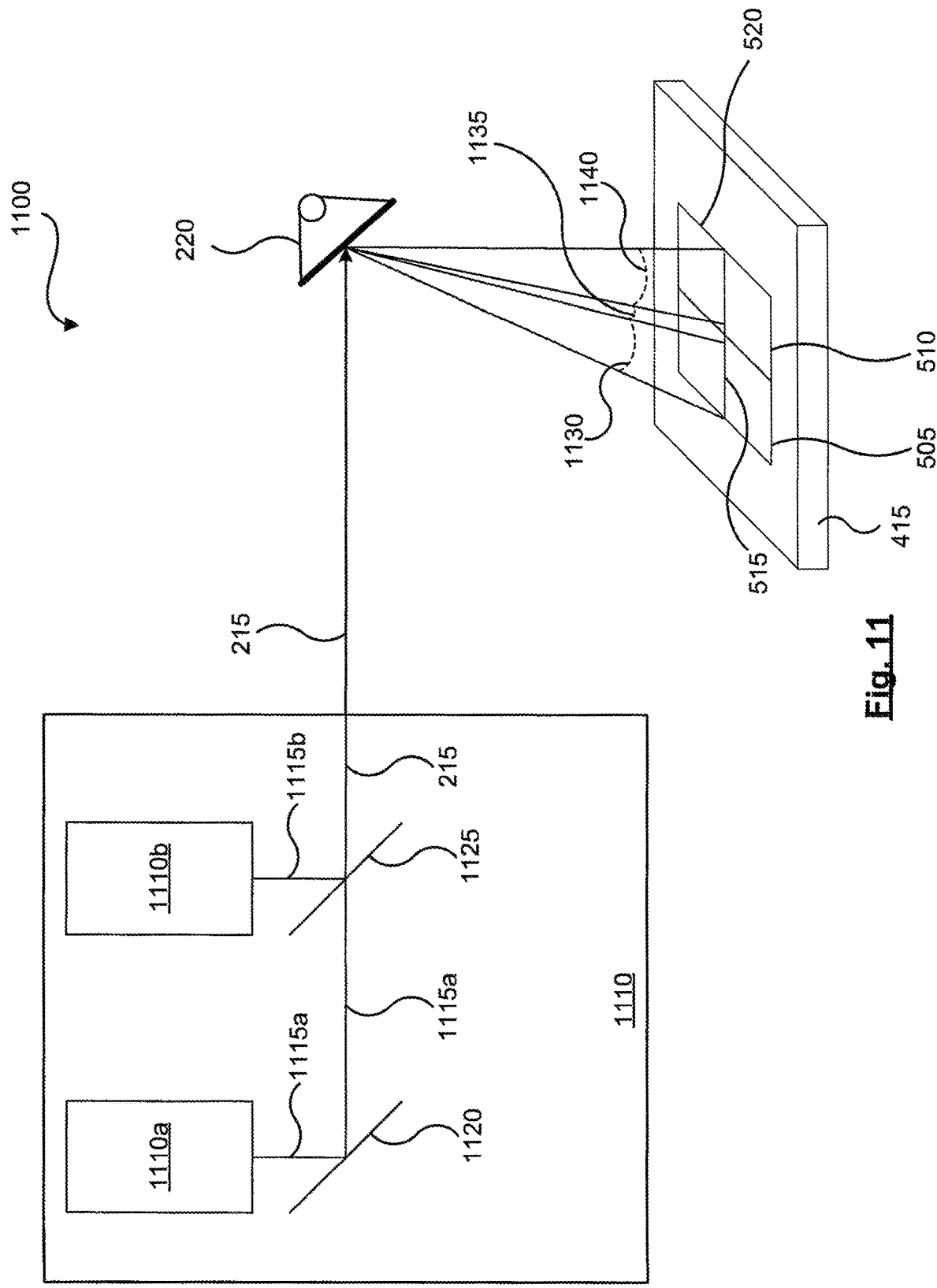

DISPLAYS AND METHODS OF OPERATING THEREOF

CROSS REFERENCE TO RELATED APPLICATION

This application claims the benefit of U.S. Provisional Application No. 62/791,514, filed 11 Jan. 2019, titled "Systems, Devices, and Methods for Light Guide Based Wearable Heads-Up Displays", the content of which is incorporated herein in its entirety by reference.

FIELD

The present specification relates to displays and methods of operating thereof, and in particular to wearable head-us displays and methods of operating thereof to provide an enlarged field of view.

BACKGROUND

Displays may be used to form still or moving images. Some displays may use a display panel to form images. Examples of such display panels include Light Emitting Diode (LED) display panels, Liquid Crystal Display (LCD) panels, and the like. In addition, some displays may use projectors to project still or moving images. Small displays may be used to form, or as a part of, mobile or wearable devices. For example, some displays may form or be part of a wearable heads-up display.

SUMMARY

According to an implementation of the present specification there is provided a method of operating a wearable heads-up display (WHUD), the WHUD comprising a light source, a spatial modulator, and a display optic, the method comprising: generating, by the light source, a first light having a first wavelength and a second light having a second wavelength, the first wavelength being within about 50 nm of the second wavelength; directing the first light by the spatial modulator onto an incoupler of the display optic along a first range of input angles relative to the incoupler, the incoupler to direct the first light into the display optic, wherein: the first range of input angles corresponds to positions of pixels of a first portion of an image to be displayed by the WHUD; and the incoupler has a first angular bandwidth corresponding to the first wavelength and a second angular bandwidth corresponding to the second wavelength; directing the second light by the spatial modulator onto the incoupler along a second range of input angles relative to the incoupler, the incoupler to direct the second light into the display optic, wherein: the second range of input angles corresponds to positions of pixels of a second portion of the image to be displayed by the WHUD; and a combination of the first range of input angles and the second range of input angles is larger than the first angular bandwidth and larger than the second angular bandwidth; and directing, by the display optic, the first light and the second light into a field of view of a user to form the image.

The first wavelength may be within about 20 nm of the second wavelength; and the generating the first light and the second light may comprise generating the first light having the first wavelength being within about 20 nm of the second wavelength of the second light.

The first wavelength may be within about 2 nm of the second wavelength; and the generating the first light and the second light may comprise generating the first light having the first wavelength being within about 2 nm of the second wavelength of the second light.

The first angular bandwidth and the second angular bandwidth may each comprise a respective full-width-at-half-maximum (FWHM) of incoupling efficiency of the incoupler as a function of angles of incidence relative to the incoupler for the first wavelength and the second wavelength respectively.

The incoupler may comprise at least one of a hologram and a surface relief grating.

The directing the first light onto the incoupler may comprise directing the first light onto the incoupler to center the first range of input angles at about a center of the first angular bandwidth of the incoupler; and the directing the second light onto the incoupler may comprise directing the second light onto the incoupler to center the second range of input angles at about a center of the second angular bandwidth of the incoupler.

The method may further comprise: directing the first light onto the spatial modulator at a first angle relative to the spatial modulator; and directing the second light onto the spatial modulator at a second angle relative to the spatial modulator, the second angle different than the first angle.

The directing the first light onto the incoupler may comprise directing the first light onto the incoupler during a first time portion and a second time portion of a sweep time of the spatial modulator; and the directing the second light onto the incoupler may comprise directing the second light onto the incoupler during the second time portion and a third time portion of the sweep time of the spatial modulator.

According to another implementation of the present specification there is provided a wearable heads-up display (WHUD) comprising: a light source to generate an output light; a spatial modulator to receive the output light from the light source; a display optic to receive the output light from the spatial modulator and direct the output light towards an eye of a user of the WHUD to form an image viewable by the user, the display optic comprising an incoupler to direct the output light into the display optic; and a controller in communication with the light source and the spatial modulator, the controller to: control the light source to generate the output light comprising a first light having a first wavelength and a second light having a second wavelength, the first wavelength being within about 50 nm of the second wavelength; control the spatial modulator to direct the first light onto the incoupler along a first range of input angles relative to the incoupler, wherein: the first range of input angles corresponds to positions of pixels of a first portion of the image; and the incoupler has a first angular bandwidth corresponding to the first wavelength and a second angular bandwidth corresponding to the second wavelength; control the spatial modulator to direct the second light onto the incoupler along a second range of input angles relative to the incoupler, wherein: the second range of input angles corresponds to positions of pixels of a second portion of the image; and a combination of the first range of input angles and the second range of input angles is larger than the first angular bandwidth and larger than the second angular bandwidth.

The first wavelength may be within about 20 nm of the second wavelength.

The first wavelength may be within about 2 nm of the second wavelength.

The first angular bandwidth and the second angular bandwidth may each comprise a respective full-width-at-half-maximum (FWHM) of incoupling efficiency of the incoupler as a function of angles of incidence relative to the incoupler for the first wavelength and the second wavelength respectively.

The incoupler may comprise at least one of a hologram and a surface relief grating.

To control the spatial modulator to direct the first light and the second light onto the incoupler the controller may be to: control the spatial modulator to direct the first light onto the incoupler to center the first range of input angles at about a center of the first angular bandwidth of the incoupler; and control the spatial modulator to direct the second light onto the incoupler to center the second range of input angles at about a center of the second angular bandwidth of the incoupler.

The first light may be incident upon the spatial modulator at a first angle relative to the spatial modulator; and the second light may be incident upon the spatial modulator at a second angle relative to the spatial modulator, the second angle different than the first angle.

To control the spatial modulator to direct the first light and the second light onto the incoupler the controller may be to: control the light source and the spatial modulator to direct the first light onto the incoupler during a first time portion and a second time portion of a sweep time of the spatial modulator; and control the light source and the spatial modulator to direct the second light onto the incoupler during the second time portion and a third time portion of the sweep time of the spatial modulator.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 1 shows a flowchart of an example method of operating a wearable heads-up display, in accordance with a non-limiting implementation of the present specification.

FIG. 11 shows a schematic representation of yet another an example system which may be used to form or project an image, in accordance with a non-limiting implementation of the present specification.

DETAILED DESCRIPTION

Figure 2:
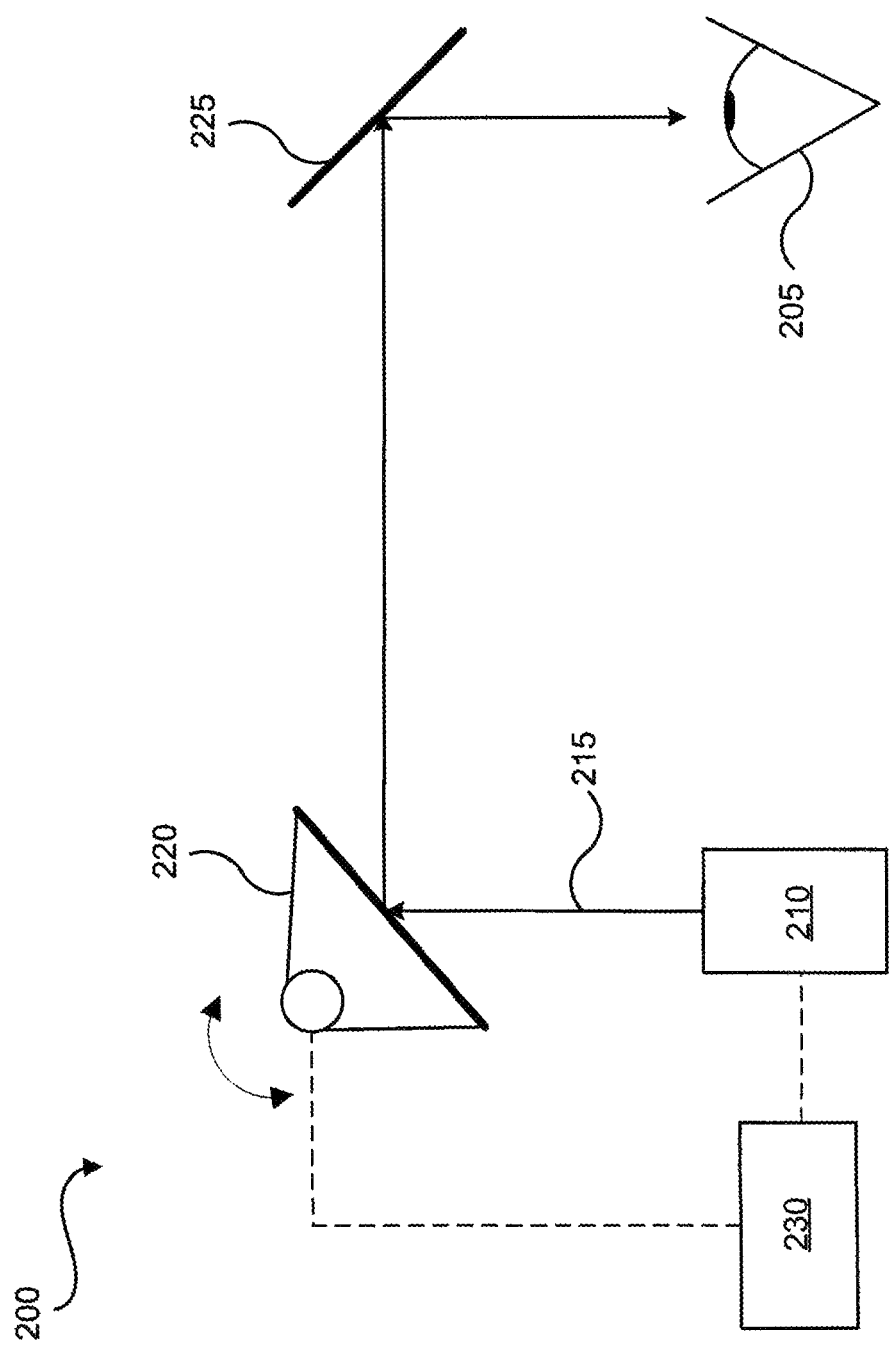
FIG. 2 shows a schematic representation of an example system which may be used to form or project an image, in accordance with a non-limiting implementation of the present specification.

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Throughout this specification and the appended claims, the term "carries" and variants such as "carried by" are generally used to refer to a physical coupling between two objects. The physical coupling may be direct physical coupling (i.e. with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, secured to, and/or supported by, with or without any number of intermediary physical objects therebetween.

Displays may use display optics to guide and manipulate light to form images. Examples of such display optics are described in greater detail in relation to FIGS. 2-5. In some examples, such display optics may comprise an incoupler (IC) to receive a display light and direct at least a portion of the display light into a light guide of the display optic to form an incoupled light. The display light may also be described as the output light. The incoupled light may then propagate in the light guide and become incident upon an outcoupler (OC) of the display optic. The OC, in turn, may direct some of the incoupled light out of the light guide to form an outcoupled light propagating towards an eye of a viewer of the display to form an image viewable by the viewer. The viewer may also be described as a user of the display.

In some examples, the IC may have an angular bandwidth. Output light that becomes incident upon the IC within the IC's angular bandwidth may be incoupled into the light guide at an efficiency that is higher compared to an efficiency of incoupling of output light that becomes incident upon the IC outside of the IC's angular bandwidth. In some examples, displaying a larger image or a more expansive field-of-view (FOV) may use a range of angles at which the display light may become incident upon the IC, which range may be larger than the angular bandwidth of the IC. As such, in some examples, the angular bandwidth of the IC may limit the size of the image or FOV that may be efficiently displayed by a display using a given IC.

FIG. 1 shows a flowchart of an example method 100 of operating a wearable heads-up display (WHUD). In some examples, the WHUD may comprise a light source, a spatial modulator, and a display optic. Moreover, in some examples, the display optic may comprise optical elements such an IC, light guide, and OC used to guide or manipulate light. Example displays, WHUDs, and display optics are described in greater detail in relation to FIGS. 2-5 and 9-11. Method 100 may be used to at least partially reduce or relax the limits on image size or FOV imposed by the angular bandwidth of an IC of the display optic of the WHUD.

Turning now to method 100, at box 105 a first light and a second light may be generated by the light source of the WHUD. The first and second lights may have a first wavelength and a second wavelength respectively. In some examples, the first wavelength may be within about 50 nm of the second wavelength. Moreover, in some examples, "about X" may comprise X±(10% of X). Furthermore, in some examples, "about X" may comprise X±(5% of X). In addition, in some examples, "about X" may comprise X±(2% of X). It is also contemplated that in some examples, "about X" may comprise X±(1% of X).

Moreover, in some examples, the first wavelength may be within about 20 nm of the second wavelength. Furthermore, in some examples, the first wavelength may be within about 10 nm of the second wavelength. In addition, in some examples, the first wavelength may be within about 5 nm of the second wavelength. It is also contemplated that in some examples, the first wavelength may be within about 2 nm of the second wavelength. In some examples, the first and second wavelengths may be selected to be sufficiently close to one another such that the first wavelength is indistinguishable from the second wavelength by a human user of the WHUD.

Furthermore, in some examples, the light source may comprise a laser-based light source, and the like. In some examples, the light source may comprise two separate light emitters, one to emit the first light and the second to emit the second light. Light emitters may also be described as light generators. Moreover, in some examples, the light source may comprise one light source to emit an output light, which is the then split into offspring beams. At least one of which offspring beams may then be wavelength shifted, and the offspring beams may then form the first light and the second light.

At box 110, the first light is directed by the spatial modulator onto the incoupler of the display optic along a first range of input angles relative to the incoupler. As discussed above, the incoupler may then direct the first light into the display optic. In some examples, the IC may direct the first light into a light guide of the display optic. Furthermore, in some examples, the IC may comprise a diffractive optical element, such as a hologram, a surface relief grating (SRG), and the like.

The incoupler may have a first angular bandwidth corresponding to the first wavelength and a second angular bandwidth corresponding to the second wavelength. In some examples, the first angular bandwidth and the second angular bandwidth may each comprise a respective full-width-at-half-maximum (FWHM) of incoupling efficiency of the incoupler as a function of angles of incidence relative to the incoupler for the first wavelength and the second wavelength respectively. The angular bandwidth of the IC is discussed in greater detail in relation to FIGS. 6-8.

The first range of input angles may correspond to positions of pixels of a first portion of an image to be displayed by the WHUD. At box 115, the second light may be directed by the spatial modulator onto the IC along a second range of input angles relative to the IC. The IC, in turn, may direct the second light into the display optic. In some examples, the IC may direct the second light into a light guide of the display optic. The second range of input angles may correspond to positions of pixels of a second portion of the image to be displayed by the WHUD.

A combination of the first range of input angles and the second range of input angles may be larger than the first angular bandwidth and larger than the second angular bandwidth. In other words, using the first and the second lights, with the first wavelength being offset from the second wavelength, may allow for the effective angular bandwidth of the IC to be larger than if one light with one wavelength is used to form the image. This larger effective IC angular bandwidth may in turn allow the combination of the first range of input angles (corresponding to the first portion of the image) and the second range of input angles (corresponding to the second portion of the image) to be larger than the range of input angles that would correspond, or fit within, the angular bandwidth of the IC for one light having one wavelength.

As discussed above, the first and second ranges of input angles correspond to the first and second portions of the image to be displayed by the WHUD. The relatively larger combination of the first and second ranges of input angles, in turn, allows for a larger image to be displayed or for the WHUD to have a larger FOV. Selecting the first and second wavelengths to be relatively close to one another may render imperceptible to the user the fact that the first and second portions of the image are formed using the first and second lights which have different wavelengths, i.e. different colors.

At box 120, the display optic may direct the first light and the second light into a field of view of the user to form the image. In some examples, the display optic may comprise a light guide optically coupled to an OC. The light guide may guide the light from the IC to the OC, and the OC may then direct some of the light out of the light guide and towards an eye of the user to form the image. Moreover, in some examples, the OC may comprise a diffractive optical element such as a hologram, a SRG, and the like.

In some examples, the first and second ranges of input angles may be partially overlapping, which corresponds with the corresponding first and second portions of the image to be partially overlapping. Moreover, in some examples, the first and second ranges of input angles may be abutting, but need not be overlapping. In such examples the corresponding first and second portions of the image may also be abutting, but need not be overlapping. In addition, in some examples, the first and second ranges of input angles need not be overlapping nor abutting, and may be spaced from one another. In such examples the corresponding first and second portions of the image need not be overlapping nor abutting, and may be spaced from one another.

While example method 100 uses two light beams with offset wavelengths to form the image, it is contemplated that in some examples three or more beams with corresponding wavelengths offset from one another may be used to form the image. In examples where three or more beams are used, the beams may be used to form three or more corresponding portions of the image to be displayed by the WHUD.

Furthermore, in some examples, directing the first light onto the incoupler may comprise directing the first light onto the incoupler to center the first range of input angles at about a center of the first angular bandwidth of the incoupler. Moreover, directing the second light onto the incoupler may comprise directing the second light onto the incoupler to center the second range of input angles at about a center of the second angular bandwidth of the incoupler. For some example ICs, incoupling efficiency is highest at the center of the angular bandwidth and declines the further the input angle deviates from the center. For such ICs, centering the range of input angles for a given wavelength at the center of the corresponding IC angular bandwidth may allow the central portions of the angular bandwidth with the highest incoupling efficiency to be used for incoupling the light by the IC, while avoiding or reducing use of the outer ends of the angular bandwidth which may have lower incoupling efficiencies than nearer the centre of the angular bandwidth.

In some examples, method 100 may further comprise directing the first light onto the spatial modulator at a first angle relative to the spatial modulator, and directing the second light onto the spatial modulator at a second angle relative to the spatial modulator. The second angle may be different than the first angle. This separation between the first and second angles may allow the first and second lights to be directed by the spatial modulator onto the IC to form different portions of the image, without the need to modify the spatial modulator to accommodate the larger image sizes and FOVs made possible by the use of the wavelength-offset first and second lights to form the image. An example of such a separation between the first and second angles is described further in relation to FIG. 10.

Moreover, in some examples, directing the first light onto the incoupler may comprise directing the first light onto the incoupler during a first time portion and a second time portion of a sweep time of the spatial modulator. Directing the second light onto the incoupler, in turn, may comprise directing the second light onto the incoupler during the second time portion and a third time portion of the sweep time of the spatial modulator. Sweep time may refer to the period of time taken for the spatial modulator to cover one pass within its full range of motion. In some examples, the image may comprise a rectangular array of pixels (i.e. the image field), the rectangle having a height and a width. In such examples, a full pass of the spatial modulator may correspond to the height or width of the image field. It is also contemplated that in some examples the full pass may correspond to a different dimension of the image field, other than a height or a width.

In some examples, to allow the first light to be directed onto the IC during the first and second time portions, the light source may generate the first light during the first and second time portions. Similarly, to allow the second light to be directed onto the IC during the second and third time portions, the light source may generate the second light during the second and third time portions. The first and second time portions may correspond to a first portion of the spatial modulator's sweep which corresponds to the first portion of the image, and the second and third time portions may comprise to a second portion of the spatial modulator's sweep which corresponds to the second portion of the image The second time portion may represent an overlap period when both the first and second lights are generated and directed onto the IC. This overlap period may correspond to an overlap between the first and second portions of the image. It is also contemplated that in some examples, the second time period may be about zero. In other words, in some examples, there need not be an overlap between the first and third time portions, or the corresponding portions of the image generated during those time portions.

In some examples, the display light or output light may comprise laser light, and the like. In color displays, the output light may comprise a plurality of colors, such as red, green, blue, and the like. In some examples, in such color displays one or more of the colors may be split into two or more wavelength-offset light beams as described in relation to method 100 and the other methods described herein.

Turning now to FIG. 2, a schematic representation of an example system 200 is shown. System 200 may be used to form or project an image viewable by an eye 205 of a viewer. System 200 may also be referred to or described as an image projection device, a display device, a display system, or a display. System 200 may comprise a light source 210 to generate an output light 215. In some examples, system 200 may be used to implement method 100 and the other methods described herein. Light source 210 may comprise a laser, a light emitting diode, and the like. System 200 may also comprise a spatial modulator 220 to receive output light 215 from light source 210. In some examples, spatial modulator 220 may comprise a movable reflector, a micro-electro-mechanical system (MEMS), a digital micromirror device (DMD), and the like.

Furthermore, system 200 may comprise a display optic 225 to receive output light 215 from spatial modulator 220 and direct the output light towards eye 205 of a viewer. In some examples, display optic 225 may comprise an optical incoupler, a waveguide, and an optical outcoupler, as described in greater detail in relation to FIG. 4. Moreover, in some examples system 200 may be a part of or incorporated into a wearable heads-up display (WHUD). Such a heads-up display may have different designs or form factors, such as the form factor of eyeglasses, as is described in greater detail in relation to FIG. 3. In examples where system 200 is in the form factor of glasses, display optic 225 may be on or in a lens of the glasses.

In addition, system 200 comprises a controller 230 in communication with light source 210 and spatial modulator 220. Controller 230 may control light source 210 and spatial modulator 220 to project an image. In some examples, the image to be projected may be a still image, a moving image or video, an interactive image, a graphical user interface, and the like.

In some examples, the controllers described herein such as controller 230 may comprise a processor in communication with a non-transitory processor-readable medium. The processor-readable medium may comprise instructions to cause the processors to control the light source and the spatial modulator as described in relation to the methods and systems described herein. Moreover, in some examples the controllers may be free-standing components, while in other examples the controllers may comprise functional modules incorporated into other components of their respective systems.

Furthermore, in some examples the controllers or their functionality may be implemented in other ways, including: via Application Specific Integrated Circuits (ASICs), in standard integrated circuits, as one or more computer programs executed by one or more computers (e.g., as one or more programs running on one or more computer systems), as one or more programs executed by on one or more controllers (e.g., microcontrollers), as one or more programs executed by one or more processors (e.g., microprocessors, central processing units, graphical processing units), as firmware, and the like, or as a combination thereof.

Figure 3:
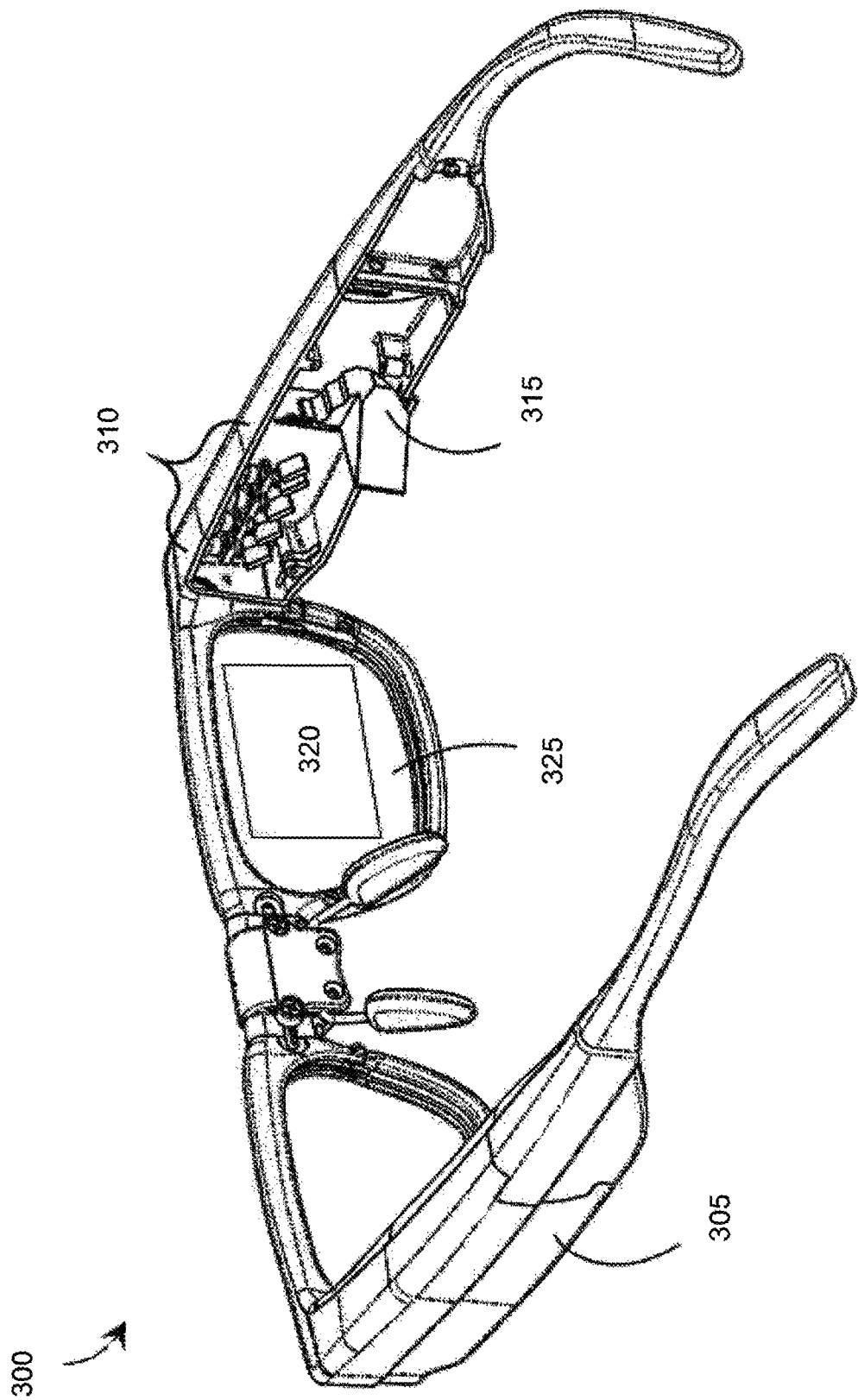
FIG. 3 shows a partial-cutaway perspective view of an example wearable heads-up display, in accordance with a non-limiting implementation of the present specification.

Turning now to FIG. 3, a partial-cutaway perspective view of an example wearable heads-up display (WHUD) 300 is shown. WHUD 300 includes a support structure 305 that in use is worn on the head of a user and has the general form factor and appearance of an eyeglasses (e.g. sunglasses) frame. Eyeglasses or sunglasses may also be generically referred to as "glasses". Support structure 305 may carry components of a system to display an image, such as system 200. For example, the light source module may be received in a space 310 in a side arm of support structure 305. In other examples, one or more of the image projection and output light adjustment system components or systems described herein may be received in or carried by support structure 305.

The spatial modulator of the systems described herein may be received in or be part of component 315 of support structure 305. The spatial modulator in turn may direct the output light onto a display optic 320 carried by a lens 325 of support structure 305. In some examples, display optic 320 may be similar in structure or function to display optic 225. Moreover, in some examples display optic 320 may comprise an optical incoupler, a waveguide, and an optical outcoupler, as described in greater detail in relation to FIG. 4.

Figure 4:
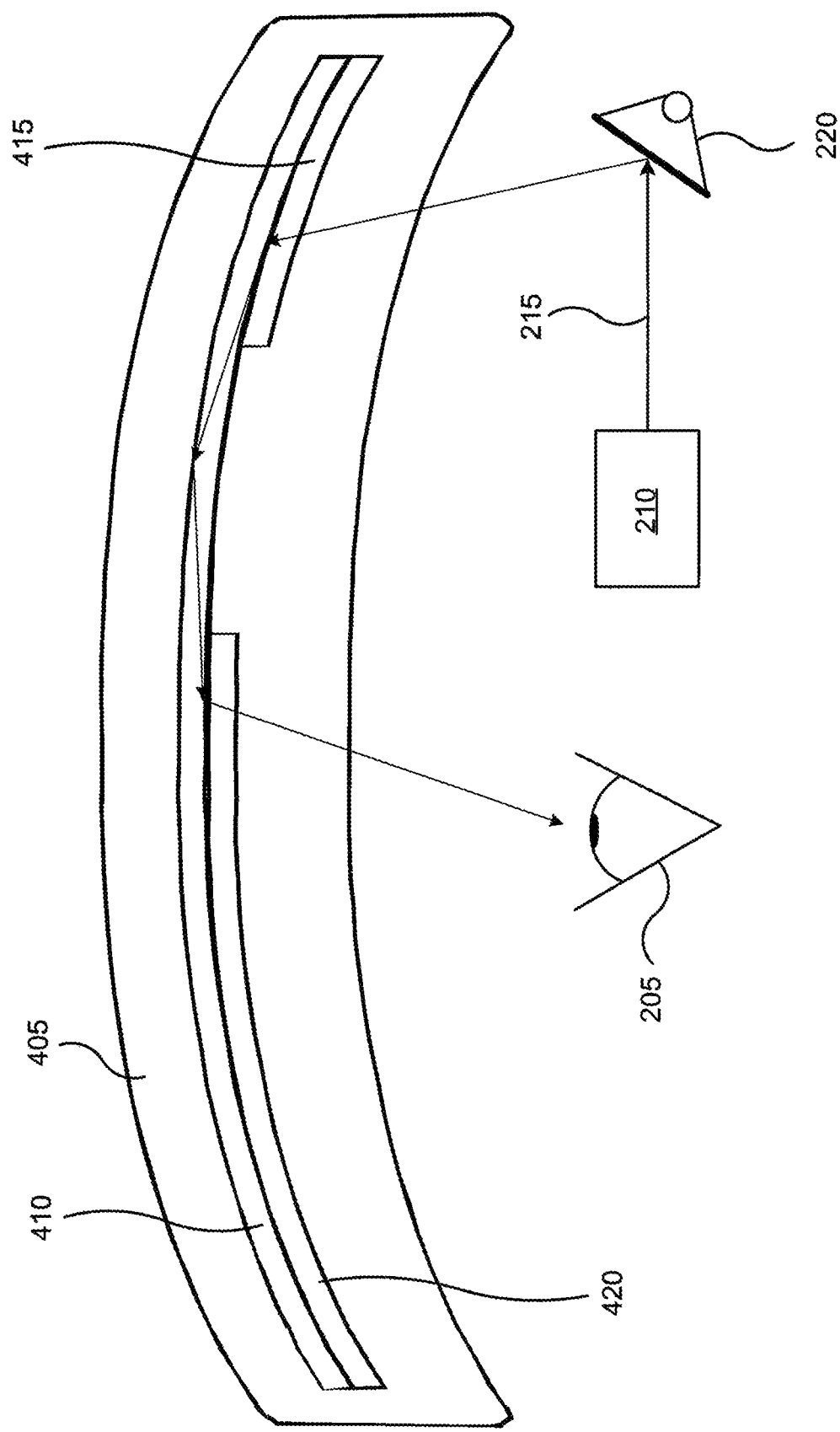
FIG. 4 shows a schematic cross-sectional representation of an example lens of an example wearable heads-up display, in accordance with a non-limiting implementation of the present specification.

Turning now to FIG. 4, a schematic cross-sectional representation is shown of an example lens 405 of an example WHUD. The components in FIG. 4 are not cross-hatched to allow for a clearer illustration of the path of an example ray of light traversing these components. In some examples, lens 405 may be used as lens 325 in WHUD 300. Lens 405 has embedded within it a display optic.

The display optic comprises a light guide 410, and an optical incoupler 415 and an optical outcoupler 420 both carried upon light guide 410. It is contemplated that in some examples, this display optic may be used as display optic 225 in system 200. In some examples, light guide 410 may guide light within it using total internal reflection. Incoupler 415 may receive an incoming beam of light, such as output light 215 generated by light source 210. Incoupler 415 may then redirect output light 215 towards light guide 410 at an angle that allows output light 215 to enter light guide 410, and to travel through light guide 410. Total internal reflection may prevent output light 215 from leaking from the walls of light guide 410.

Once output light 215 that is travelling in light guide 410 reaches and becomes incident upon outcoupler 420, outcoupler 420 may direct output light 215 out of light guide 410 and towards eye 205 of a user. In some examples, incoupler 415 and outcoupler 420 may comprise surface relief gratings (SRGs), holograms, and the like. Moreover, while FIG. 4 shows incoupler 415 and outcoupler 420 as being components carried on an outer surface of light guide 410, it is contemplated that in some examples the incoupler or the outcoupler may comprise surface features such as SRGs on the light guide itself. In other words, in some examples the incoupler or the outcoupler may be optical features or elements incorporated within or on the surface of the light guide itself.

Furthermore, it is contemplated that in some examples the incoupler may be incorporated within or on an inner surface of the light guide, such that the incoming output light passes through at least a portion of the light guide before impinging on the incoupler. In some examples, the combination of light guide 410, incoupler 415, and outcoupler 420 may be described as a display optic. Such a display optic may be used as display optic 225 in system 200 or display optic 320 in WHUD 300.

It is also contemplated that in some examples, the display optic shown in FIG. 4 may also comprise an exit pupil expander (EPE). The EPE may increase the number of exit pupils, thereby enlarging the eyebox and the field of view of displays whose display optics include the EPE. In some examples, the EPE may be disposed between light guide 410 and outcoupler 420. Moreover, in some examples, the EPE may be disposed on the side of outcoupler 420 opposite light guide 410. Furthermore, in some examples, the EPE may be combined with or incorporated into outcoupler 420. The EPE may comprise a SRG, a hologram, and the like.

Figure 5:
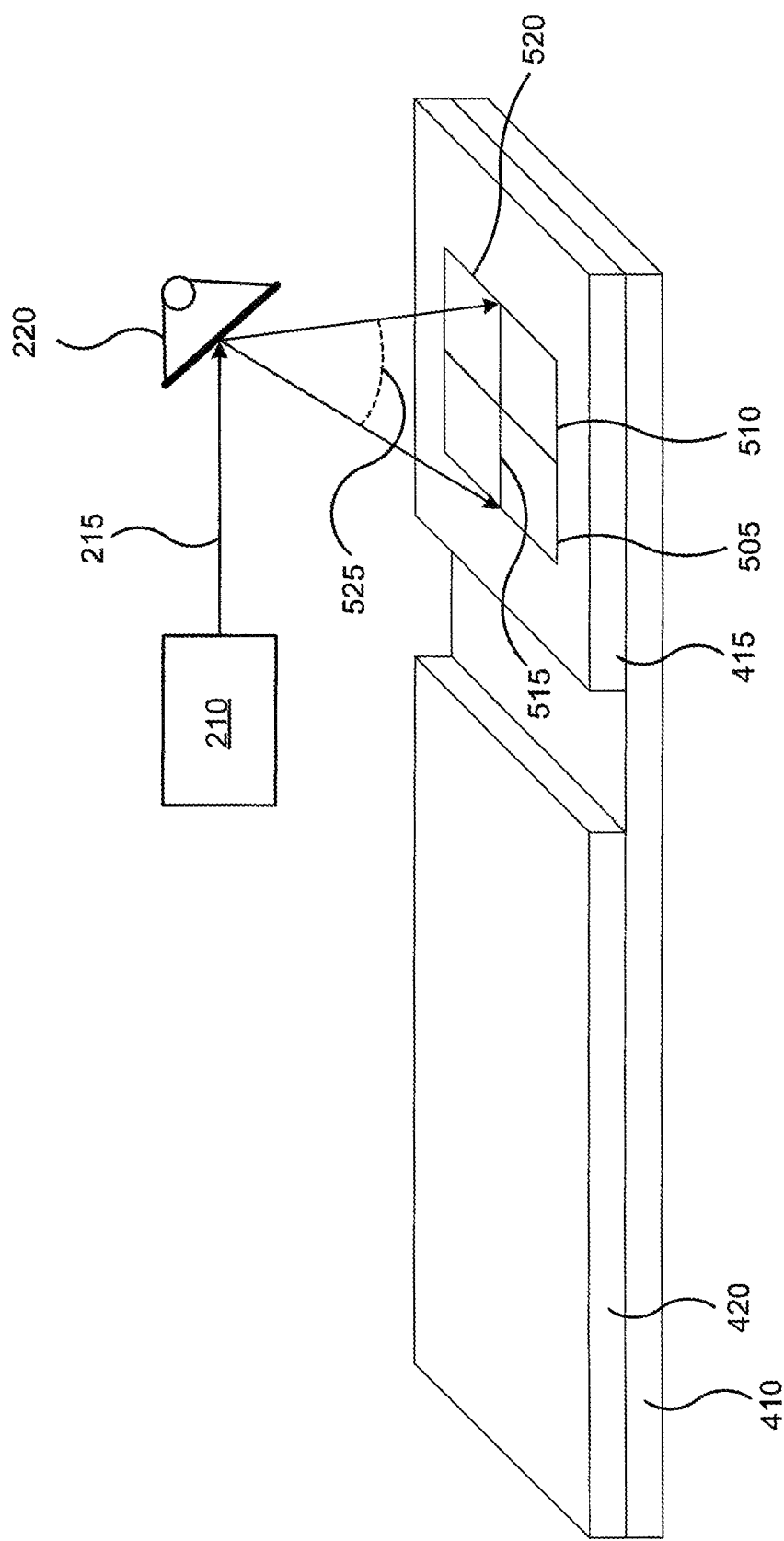
FIG. 5 shows a schematic representation of the display optic shown in FIG. 4.

FIG. 5 shows a schematic representation of the display optic shown in FIG. 4. FIG. 5 shows four pixels 505, 510, 515, and 520 projected by spatial modulator 220 on incoupler 415. While FIG. 5 shows for simplicity of illustration four pixels forming a 2×2 image field, it is contemplated that in some examples the field may have a different number of pixels. Moreover, the light guide, incoupler, and outcoupler which are shown as being curved in the cross-section in FIG. 4 are shown without said curvature (i.e. as being planar) in FIG. 5, for ease of illustration.

As shown in FIG. 5, the size or number of pixels of the image corresponds to an angle 525 within which output light 215 may be directed onto IC 415 by spatial modulator 220. To project a larger image or a larger FOV, angle 525 may become correspondingly larger. If angle 525 becomes larger than an angular bandwidth of IC 415, the portions or instances of output light 215 that become incident upon IC 415 outside of its angular bandwidth may not be efficiently incoupled into light guide 410 by IC 415.

Figure 6:
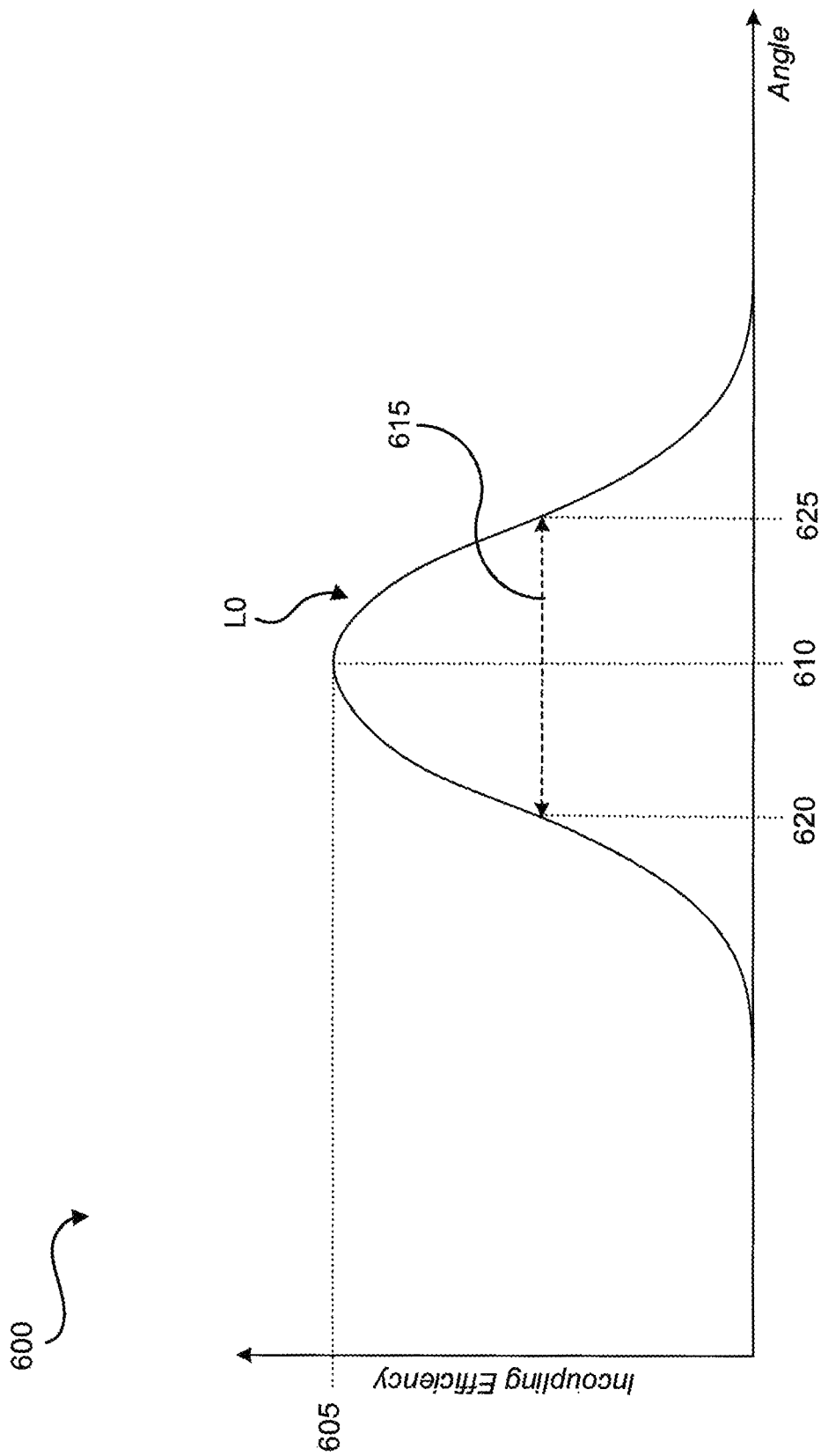
FIG. 6 shows an example graph of an example incoupling efficiency of an incoupler as a function of the angles of incidence of an output light relative to the incoupler, in accordance with a non-limiting implementation of the present specification.

Turning now to FIG. 6, an example graph 600 is shown of an example incoupling efficiency of IC 415 as a function of the angles of incidence of the output light relative to IC 415, which output light may have a wavelength L0. Angles of incidence of the output light relative to IC 415 may also be referred to as input angles. IC 415 has a maximum incoupling efficiency 605 at an angle 610. The incoupling efficiency then drops off as the input angle deviates from angle 610. An incoupling efficiency threshold may be defined above which threshold the incoupling efficiency of IC 415 is high enough to allow for practical or efficient operation of a display incorporating IC 415.

In some examples, this incoupling efficiency threshold may be set at half the maximum incoupling efficiency 605. In such examples, the full width at half maximum (FWHM) of graph 600 may define an angular bandwidth 615 for IC 415, which angular bandwidth 615 extends from input angle 620 to input angle 625. In other words, within angular bandwidth 615 the incoupling efficiency of IC 415 is at or above the efficiency threshold (having been selected as being half of maximum efficiency 605), while outside angular bandwidth 615 the incoupling efficiency of IC 415 may be below the efficiency threshold. Angle 610 may also be described as the center angle of angular bandwidth 615.

While FIG. 6 shows an about normal distribution of incoupling efficiency as a function of input angles, it is contemplated that in some examples incoupling efficiency may be a different function of input angles. Moreover, while in FIG. 6 angular bandwidth 615 is defined based on an efficiency threshold set at half of maximum efficiency 605, it is contemplated that in some examples the efficiency threshold may be set or defined to be other than half of maximum efficiency 605.

Referring now to FIGS. 5 and 6, if angle 525 becomes larger than angular bandwidth 615 of IC 415, portions or instances of output light 215 that fall outside of angular bandwidth 615 may not be efficiently incoupled into light guide 410. As such, angular bandwidth 615 may impose a practical or efficiency limit to angle 525, which in turn may limit the image size or FOV that may be produced by a display that incorporates or uses IC 415.

Figure 7:
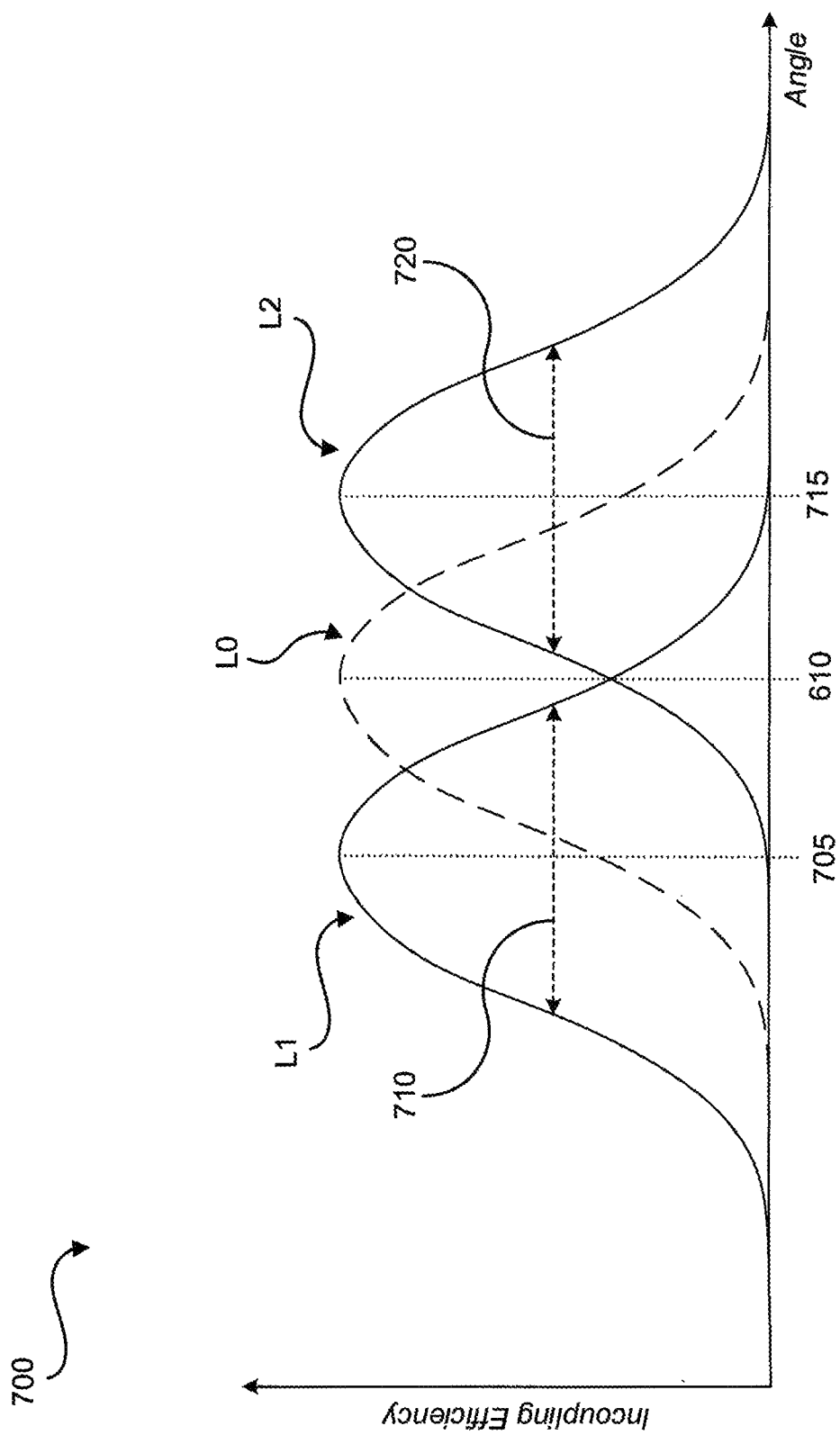
FIG. 7 shows other example graphs of example incoupling efficiencies of an incoupler as a function of the angles of incidence of output lights relative to the incoupler, in accordance with a non-limiting implementation of the present specification.

In order to reduce or relax the limits on image size or FOV imposed by the angular bandwidth of IC 415, to display a given color of the image two wavelength-shifted light beams may be used. The first light may have a wavelength L1 and the second light may have a wavelength L2. FIG. 7 shows an example graph 700 of example incoupling efficiencies of IC 415 as a function of the angles of incidence relative to IC 415 for the first light and the second light having wavelengths L1 and L2 respectively. The incoupling efficiency plot of the output light having wavelength L0 is also reproduced in dashed lines, for reference.

Using the first light having the wavelength L1 shifts a center angle 705 of the incoupling efficiency plot of the first light compared to the corresponding plot for the output light which has wavelength L0 and a maximum at center angle 610. For the first light having a wavelength L1, IC 415 may have an angular bandwidth 710. Similarly, using the second light having the wavelength L2 shifts a center angle 715 of the incoupling efficiency plot of the second light compared to the corresponding plot for the output light which has wavelength L0 and a maximum efficiency at center angle 610. For the second light having the wavelength L2, IC 415 may have an angular bandwidth 720.

While FIG. 7 shows incoupling efficiency plots for the first and second lights as having the same shape and FWHM as the incoupling efficiency plot for the output light having wavelength L0, it is contemplated that in some examples the shape (including for example the maximum efficiency and the FWHM) of the incoupling efficiency plots may change as a function of changes to the wavelength of the light incident upon the IC.

If L1 and L2 are sufficiently close to L0, then either L1 or L2 may be used in place of L0 to project the image, without the user of the display perceiving changes or distortions to the color balance of the image. Moreover, if L1 and L2 are sufficiently close to one another, both L1 and L2 may be used to form corresponding portions of the image, without the user of the display perceiving that light of different wavelengths (i.e. different colors) is used to form different portions of the image.

As discussed above, in some examples, the first wavelength (L1) may be within about 50 nm of the second wavelength (L2). Moreover, in some examples, the first wavelength may be within about 20 nm of the second wavelength. Furthermore, in some examples, the first wavelength may be within about 10 nm of the second wavelength. In addition, in some examples, the first wavelength may be within about 5 nm of the second wavelength. It is also contemplated that in some examples, the first wavelength may be within about 2 nm of the second wavelength. In general, in some examples, the first and second wavelengths may be selected to be sufficiently close to one another such that the first wavelength is indistinguishable from the second wavelength by a human user of the WHUD.

Figure 8:
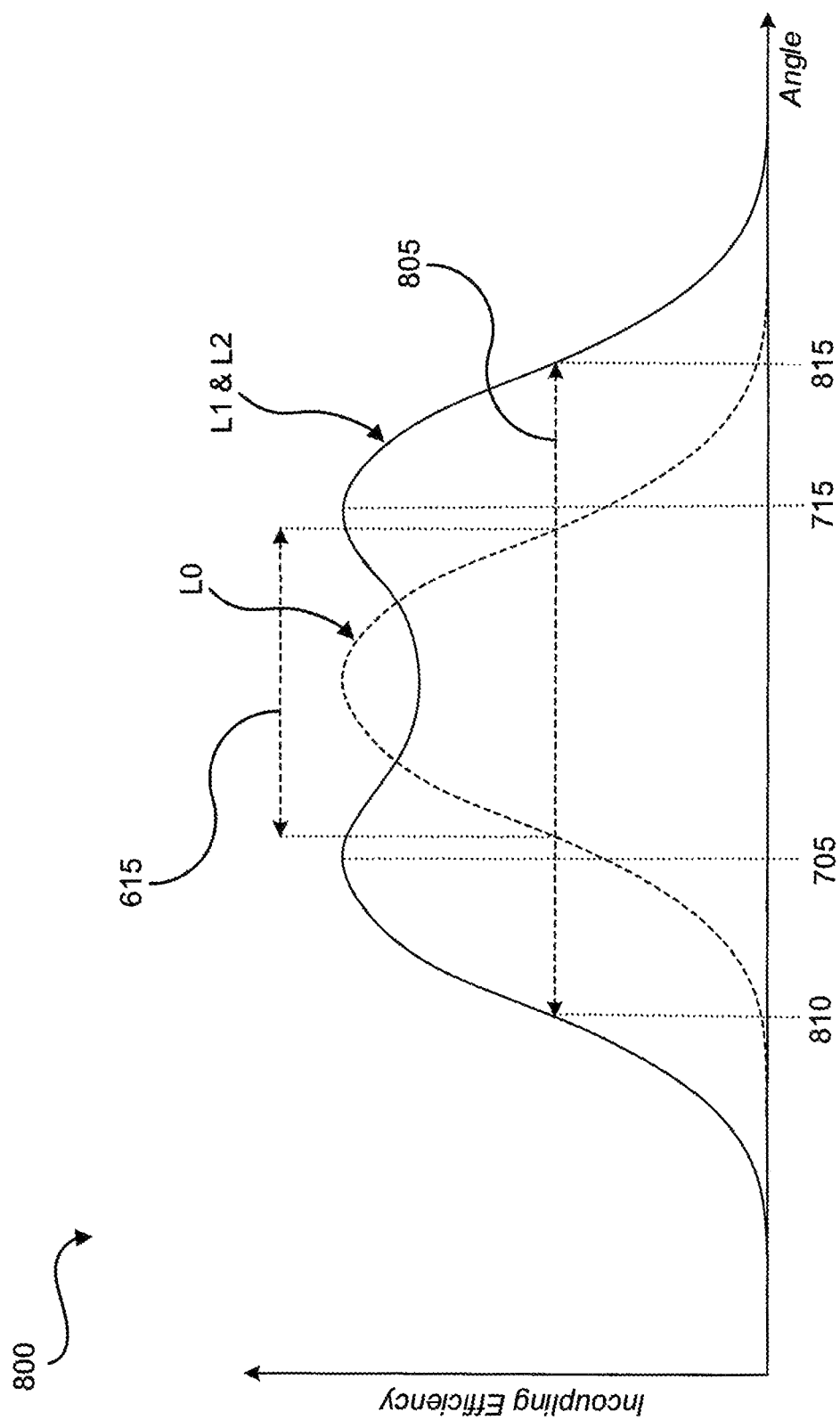
FIG. 8 shows yet another example graph of an example incoupling efficiency of an incoupler as a function of the angles of incidence of output lights relative to the incoupler, in accordance with a non-limiting implementation of the present specification.

When L1 and L2 are both used to form corresponding portions of the image formed by the display, the effective incoupling efficiency plot of IC 415 may be the sum of the incoupling efficiency plots for the first light (of wavelength L1) and the second light (of wavelength L2). FIG. 8 shows an example graph 800 of an example combined incoupling efficiency of IC 415 as a function of the angles of incidence relative to IC 415 when the first light and the second light are used to form respective parts of an image. The incoupling efficiency plot of the output light having wavelength L0 is also reproduced in dashed lines, for reference.

The FWHM of the plot of incoupling efficiency may define an angular bandwidth 805 of IC 415 when the first light and the second light are used to form respective parts of an image. Angular bandwidth 805 may span from input angle 810 to input angle 815. As shown in FIG. 8, angular bandwidth 805 may be larger compared to angular bandwidth 615 of IC 415 when one output light of wavelength L0 is used to form the image. This enlarged angular bandwidth, in turn, may allow angle 525 (shown in FIG. 5) to be correspondingly larger, while still fitting within angular bandwidth 805. A larger angle 525, in turn, corresponds to larger images or a larger FOV produced by a display using IC 415.

While FIGS. 7 and 8 show the incoupling efficiency associated with L1 as being shifted to smaller angles relative to L0, and the incoupling efficiency associated with L2 as being shifted to larger angles relative to L0, it is contemplated that in some examples, the incoupling efficiencies associated with L1 and L2 may be both shifted in the same direction, i.e. to be both shifted to smaller angles relative to L0 or to be both shifted to larger angles relative to L0. Similarly, it is contemplated that in some examples, L1 may be smaller than L0 and L2 may be larger than L0. It is also contemplated that in some examples, L1 and L2 may be either both larger or both smaller than L0.

As discussed above, method 100 and the other methods described herein may be performed by the display systems, such as WHUDs, described herein. Referring back to FIGS. 2 and 3, in some examples the WHUD may comprise light source 210 to generate output light 215. The WHUD may also comprise spatial modulator 220 to receive the output light from light source 210. In addition, the WHUD may comprise display optic 225 to receive output light 215 from spatial modulator 220 and direct the output light towards eye 205 of a user of the WHUD to form an image viewable by the user.

The WHUD may also comprise controller 230 in communication with light source 210 and the spatial modulator 220. Controller 230 may control light source 210 to generate output light 215 comprising a first light having a first wavelength and a second light having a second wavelength. The first wavelength may be within about 50 nm of the second wavelength. Moreover, in some examples, the first wavelength may be within about 20 nm of the second wavelength. Furthermore, in some examples, the first wavelength may be within about 10 nm of the second wavelength. In addition, in some examples, the first wavelength may be within about 5 nm of the second wavelength. It is also contemplated that in some examples, the first wavelength may be within about 2 nm of the second wavelength. In general, in some examples, the first and second wavelengths may be selected to be sufficiently close to one another such that the first wavelength is indistinguishable from the second wavelength by a human user of the WHUD.

Figure 9:
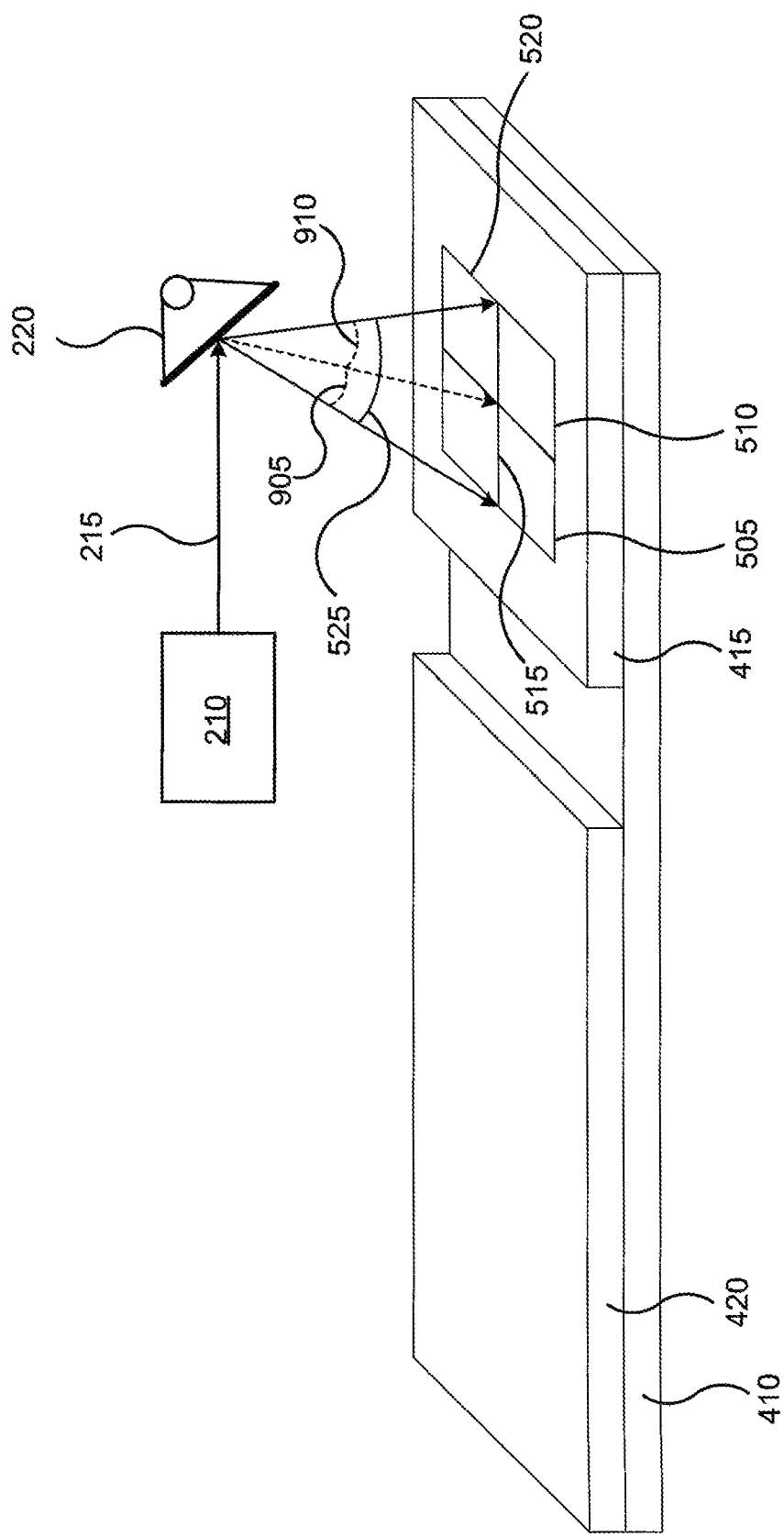
FIG. 9 shows a schematic representation of the display optic shown in FIG. 5.

Controller 230 may also control spatial modulator 220 to direct the first light onto incoupler 415 along a first range of input angles relative to the incoupler. The first range of input angles corresponds to positions of pixels of a first portion of the image. FIG. 9 shows a schematic representation of the display optic shown in FIG. 5, where the first range of input angles 905 is marked. The first range of input angles 905 may correspond to the portion of image comprising pixels 505 and 515. It is contemplated that in some examples the first range of input angles may correspond to a first portion of the image that has a shape or size other than pixels 505 and 515.

IC 415 may have first angular bandwidth 710 corresponding to the first wavelength and second angular bandwidth 720 corresponding to the second wavelength. Angular bandwidths 710 and 720 are shown in FIG. 7. Controller 230 may also control spatial modulator 220 to direct the second light onto incoupler 415 along a second range of input angles 910 relative to incoupler 415. Second range of input angles 910 may correspond to positions of pixels of a second portion of the image. In FIG. 9, second range of input angles 910 corresponds to positions of pixels 510 and 520. It is contemplated that in some examples the second range of input angles may correspond to a second portion of the image that has a shape or size other than pixels 510 and 520.

A combination of first range of input angles 905 and second range of input angles 910 may be larger than first angular bandwidth 710 and larger than second angular bandwidth 720. As discussed above, the use of the first and second lights having wavelengths offset from one another allows IC 415 to have effective combined angular bandwidth 805 (shown in FIG. 8) that is larger compared to each one of angular bandwidths 615, 710, and 720. As such, IC 415 may accommodate a combination of first range of input angles 905 and second range of input angles 910 that is larger than each one of angular bandwidths 615, 710, and 720. In this manner, the use of the first and second lights having wavelengths offset from one another allows IC 415, and system 200, to accommodate a combination of first range of input angles 905 and second range of input angles 910 that is larger than each one of angular bandwidths 615, 710, and 720.

In some examples, to control spatial modulator 220 to direct the first light and the second light onto incoupler 415 controller 230 may control spatial modulator 220 to direct the first light onto incoupler 415 to center first range of input angles 905 at about the center (i.e. center angle 705) of first angular bandwidth 710 of incoupler 415. Controller 230 may also control spatial modulator 220 to direct the second light onto incoupler 415 to center second range of input angles 910 at about the center (i.e. center angle 715) of second angular bandwidth 720 of incoupler 415.

As shown in FIG. 8, the incoupling efficiency when first and second lights with wavelengths L1 and L2 respectively are used has peak efficiencies at angles 705 and 715. In the example graph 800 shown in FIG. 8, these peaks correspond to the individual peak incoupling efficiencies for the first and second lights, as shown in FIG. 7. Centering first and second ranges of input angles 905, 910 at about the center angles 705 and 715 of angular bandwidths 710 and 720 respectively may increase the portions of first and second ranges of input angles 905, 910 that may be incoupled by IC 415 into light guide 410 at the relatively higher incoupling efficiencies that are available nearer the center angles 705 and 715 of angular bandwidths 710 and 720.

Figure 10:
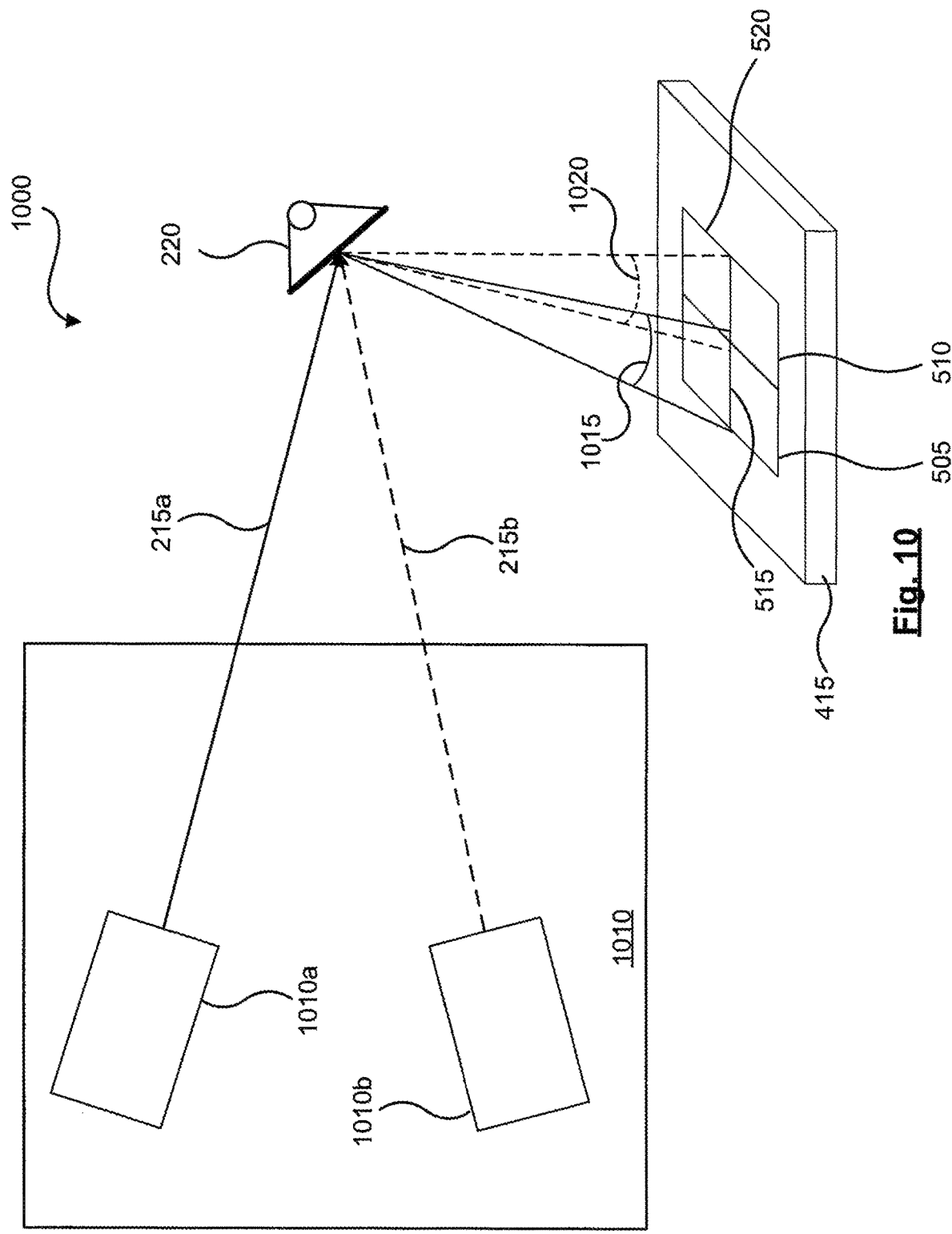
FIG. 10 shows a schematic representation of another example system which may be used to form or project an image, in accordance with a non-limiting implementation of the present specification.

Moreover, in some examples, the first light may be incident upon spatial modulator 220 at a first angle relative to spatial modulator 220, and the second light may be incident upon spatial modulator 220 at a second angle relative to spatial modulator 220. The second angle may be different than the first angle. FIG. 10 shows a schematic representation of an example display system 1000, which system 1000 may be similar to the systems described in relation to FIGS. 2-5 and 9. Moreover, while FIG. 10 shows only IC 415, it is contemplated that system 1000 may also comprise a light guide and an OC similar to light guide 410 and OC 420. The light guide and the OC are omitted in FIG. 10 for clarity of illustration. In addition, system 1000 may also comprise a controller similar to controller 230.

In system 1000 the first and second lights generated by the light source are incident upon spatial modulator 220 at different respective angles. As shown in FIG. 10, system 1000 comprises a light source 1010 which generates a first light 215a and a second light 215b. First light 215a and second light 215b are incident upon spatial modulator 220 at different angles relative to one another.

FIG. 10 shows that light source 1010 may comprise a first light generator 1010a to generate first light 215a, and a second light generator 1010b to generate second light 215b. In some examples, light generators 1010a and 1010b may comprise lasers, and the like. In addition, while FIG. 10 shows light source 1010 comprising two light generators 1010a and 1010b oriented at different angles, it is contemplated that in some examples light generators may be oriented differently relative to one another and spatial modulator 220, and a selection of optical elements may the be used to set the angles of incidence of first and second lights 215a and 215b relative to spatial modulator 220. In some examples, such optical elements may comprise reflectors, lenses, or the like, disposed in the path of first and second lights 215a and 215b from light source 1010 to spatial modulator 220.

It is also contemplated that in some examples, the light source may comprise one light generator whose output light is then split to form offspring beams, and then at least one of the offspring beams is wavelength-shifted such that the wavelengths of the offspring beams are offset from one another. These offspring beams may then form first and second lights 215a and 215b. Moreover, in some examples light source 1010 may comprise more than two light generators. For example, the light source may comprise two light generators to generate wavelength-offset red beams of light, two further light generators to generate wavelength-offset green beams of light, and yet further two light generators to generate wavelength-offset blue beams of light. Furthermore, it is contemplated that in some examples, the light source may generate three or more wavelength-offset beams per color of light used to form a color image to be displayed by the display system.

First light 215a may then be directed by spatial modulator 220 onto IC 415 along a first range of input angles 1015, which range corresponds to positions of pixels of a first portion of the image comprising pixels 505 and 515 and a portion of pixels 510 and 520. Similarly, second light 215b may be directed by spatial modulator 220 onto IC 415 along a second range of input angles 1020, which range corresponds to positions of pixels of a second portion of the image comprising pixels 510 and 520 and a portion of pixels 505 and 515. This manner of arranging or combining first light 215a and second light 215b may be described as angle-multiplexing the first and second lights. In this manner, first light 215a and second light 215b may be used to form different portions of the image. In addition, while FIG. 10 shows first range of input angles 1015 as partially overlapping second range of input angles 1020, it is contemplated that in some examples, the two ranges of input angles need not overlap, and may be merely abutting or spaced from one another.

In addition, in some examples, to control spatial modulator 220 to direct the first light and the second light onto incoupler 415 controller 230 may control the light source and spatial modulator 220 to direct the first light onto incoupler 415 during a first time portion and a second time portion of a sweep time of spatial modulator 220. Controller 230 may also control the light source and spatial modulator 220 to direct the second light onto incoupler 415 during the second time portion and a third time portion of the sweep time of spatial modulator 220. FIG. 11 shows a schematic representation of an example display system 1100, which system 1100 may be similar to the systems described in relation to FIGS. 2-5 and 9-10. Moreover, while FIG. 11 shows only IC 415, it is contemplated that system 1100 may also comprise a light guide and an OC similar to light guide 410 and OC 420. The light guide and the OC are omitted in FIG. 11 for clarity of illustration. In addition, system 1100 may also comprise a controller similar to controller 230.

In system 1100 the first and second lights generated by the light source are incident upon spatial modulator 220 during different respective time periods. As shown in FIG. 11, system 1100 comprises a light source 1110 which generates a first light 1115a and a second light 1115b. First and second lights 1115a and 1115b may be similar to first and second lights 215a and 215b. First light 1115a and second light 1115b may be incident upon spatial modulator 220 during different respective time periods.

FIG. 11 shows that light source 1110 may comprise a first light generator 1110a to generate first light 1115a, and a second light generator 1110b to generate second light 1115b. In some examples, light generators 1110a and 1110b may comprise lasers, and the like. In addition, while FIG. 11 shows light source 1110 comprising two light generators 1110a and 1110b oriented side by side, it is contemplated that in some examples the light generators may be oriented differently relative to one another and to light source 1110.

Light source 1110 may also comprise a reflector 1120 to reflect first light 1115a, and a partial reflector 1125 to transmit first light 1115a and to reflect second light 1115b. Reflector 1120 and partial reflector 1125 may cooperate to align or combine first light 1115a with second light 1115b to form output light 215 of light source 1110. It is contemplated that in some examples, different types, numbers, or arrangements of optical elements may be used to form output light 215 from first and second lights 1115a and 1115b. In some examples, such optical elements may comprise reflectors, lenses, or the like. Moreover, it is contemplated that in some examples, the optical elements used to form output light 215 from first and second lights 1115a and 1115b need not be part of light source 1110, and that these optical elements may be external to light source 1110.

A controller (not shown in FIG. 11) may control light source 1110 and spatial modulator 220 to direct first light 1115a onto IC 415 during a first and a second time portion of a sweep time of spatial modulator 220, and to direct second light 1115b onto IC 415 during the second and a third time portion of the sweep time of spatial modulator 220. For example, the controller may turn on light generator 1110a during the first and second time portions while keeping light generator 1110b off, and then turn on light generator 1110b during the second and third time portions while keeping light generator 1110a off.

The first, second, and third time portions may correspond to ranges of input angles 1130, 1135, and 1140 respectively. In this manner, first light 1115a may be used to form a first portion of the image comprising pixels 505 and 515, and a portion of pixels 510 and 520. Second light 1115b, in turn, may be used to form a second portion of the image comprising pixels 510 and 520, and a portion of pixels 505 and 515. This manner of forming the image using the first and second lights may be described as a time-multiplexing approach to forming the image.

It is also contemplated that in some examples the second time portion may have nil or zero duration. In such examples, there need not be a time portion during which both the first and the second light generators are turned on. Moreover, in such examples, range of input angles 1135 may be reduced to zero, and ranges of input angles 1130 and 1140 may cover the first and second portions of the image. It is contemplated that in some examples these first and second portions may be overlapping. Moreover, in some examples, the two ranges of input angles (and the corresponding portions of the image) need not be overlapping and may be abutting, or may be spaced from one another.

It is also contemplated that in some examples light source 1110 may comprise more than two light generators. For example, the light source may comprise two light generators to generate wavelength-offset red beams of lights, two further light generators to generate wavelength-offset green beams of lights, and yet further two light generators to generate wavelength-offset blue beams of lights. Furthermore, it is contemplated that in some examples, the light source may generate three or more wavelength-offset beams per color of light used to form a color image to be displayed by the display system.

It is contemplated that method 100 and the other methods described herein may be performed by system 200, WHUD 300, and the other systems and devices described herein. It is also contemplated that method 100 and the other methods described herein may be performed by systems or devices other than the systems and devices described herein. In addition, it is contemplated that system 200, WHUD 300, and the other systems and devices described herein may have the features and perform the functions described herein in relation to method 100 and the other methods described herein. Moreover, system 200, WHUD 300, and the other systems and devices described herein may have features and perform functions other than those described herein in relation to method 100 and the other methods described herein.

Moreover, while FIGS. 4, 5, and 9-11 show a given display optic having a given arrangement of light guide, incoupler, and outcoupler, it is contemplated that in some examples the display optic may have a different structure, and that the light guide, incoupler, and outcoupler may be arranged differently relative to one another than the arrangement shown in FIGS. 4, 5, and 9. Furthermore, while FIGS. 2, 4-5, and 9-11 show the first and second lights propagating from the spatial modulator to the IC free of intervening optical elements, it is contemplated that in some examples one or more optical elements may be present in the optical path of at least one of the first and second lights between the spatial modulator and the IC. Examples of such optical elements may include lenses, and the like. Furthermore, examples of such lenses may include biconvex lenses, and the like.

In addition, while some of the examples provided herein are described in the context of laser projectors and WHUDs, it is contemplated that the functions and methods described herein may be implemented in or by display systems or devices which may not use laser projectors or be WHUDs.

Throughout this specification and the appended claims, infinitive verb forms are often used. Examples include, without limitation: "to direct," "to form," "to control," "to center," and the like. Unless the specific context requires otherwise, such infinitive verb forms are used in an open, inclusive sense, that is as "to, at least, direct," to, at least, form," "to, at least, control," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method, comprising:
    generating, by a light source, a first light having a first wavelength and a second light having a second wavelength, the first wavelength being within about 50 nm of the second wavelength;
    directing the first light by a spatial modulator onto an incoupler of a display optic along a first range of input angles relative to the incoupler, the incoupler to direct the first light into the display optic, wherein:
        the first light is incident upon the spatial modulator at a first angle relative to the spatial modulator;
        the first range of input angles corresponds to positions of pixels of a first portion of an image to be displayed by a wearable heads-up display (WHUD); and
        the incoupler has a first angular bandwidth corresponding to the first wavelength and a second angular bandwidth corresponding to the second wavelength;
    directing the second light by the spatial modulator onto the incoupler along a second range of input angles relative to the incoupler, the incoupler to direct the second light into the display optic, wherein:
        the second light is incident upon the spatial modulator at a second angle relative to the spatial modulator, the second angle different than the first angle;
        the second range of input angles corresponds to positions of pixels of a second portion of the image to be displayed by the WHUD; and
        a combination of the first range of input angles and the second range of input angles is larger than the first angular bandwidth and larger than the second angular bandwidth; and
    directing, by the display optic, the first light and the second light into a field of view of a user to form the image.

2. The method of claim 1, wherein:
    the first wavelength is within about 20 nm of the second wavelength; and
    the generating the first light and the second light comprises generating the first light having the first wavelength being within about 20 nm of the second wavelength of the second light.

3. The method of claim 1, wherein:
    the first wavelength is within about 2 nm of the second wavelength; and
    the generating the first light and the second light comprises generating the first light having the first wavelength being within about 2 nm of the second wavelength of the second light.

4. The method of claim 1, wherein the first angular bandwidth and the second angular bandwidth each comprise a respective full-width-at-half-maximum (FWHM) of incoupling efficiency of the incoupler as a function of angles of incidence relative to the incoupler for the first wavelength and the second wavelength respectively.

5. The method of claim 1, wherein the incoupler comprises at least one of a hologram and a surface relief grating.

6. The method of claim 1, wherein:
    the directing the first light onto the incoupler comprises directing the first light onto the incoupler to center the first range of input angles at about a center of the first angular bandwidth of the incoupler; and
    the directing the second light onto the incoupler comprises directing the second light onto the incoupler to center the second range of input angles at about a center of the second angular bandwidth of the incoupler.

7. The method of claim 1, wherein:
    the directing the first light onto the incoupler comprises directing the first light onto the incoupler during a first time portion and a second time portion of a sweep time of the spatial modulator; and
    the directing the second light onto the incoupler comprises directing the second light onto the incoupler during the second time portion and a third time portion of the sweep time of the spatial modulator.

8. A wearable heads-up display (WHUD) comprising:
    a light source to generate an output light;
    a spatial modulator to receive the output light from the light source;
    a display optic to receive the output light from the spatial modulator and direct the output light towards an eye of a user of the WHUD to form an image viewable by the user, the display optic comprising an incoupler to direct the output light into the display optic; and
    a controller in communication with the light source and the spatial modulator, the controller to:
        control the light source to generate the output light comprising a first light having a first wavelength and a second light having a second wavelength, the first wavelength being within about 50 nm of the second wavelength;
        control the spatial modulator to direct the first light onto the incoupler along a first range of input angles relative to the incoupler, wherein:
            the first range of input angles corresponds to positions of pixels of a first portion of the image;
            the incoupler has a first angular bandwidth corresponding to the first wavelength and a second angular bandwidth corresponding to the second wavelength; and the spatial modulator directs the first light onto the incoupler to center the first range of input angles at about a center of the first angular bandwidth of the incoupler;

control the spatial modulator to direct the second light onto the incoupler along a second range of input angles relative to the incoupler, wherein:

the second range of input angles corresponds to positions of pixels of a second portion of the image;

a combination of the first range of input angles and the second range of input angles is larger than the first angular bandwidth and larger than the second angular bandwidth; and the spatial modulator directs the second light onto the incoupler to center the second range of input angles at about a center of the second angular bandwidth of the incoupler.

9. The WHUD of claim 8, wherein the first wavelength is within about 20 nm of the second wavelength.

10. The WHUD of claim 8, wherein the first wavelength is within about 2 nm of the second wavelength.

11. The WHUD of claim 8, wherein the first angular bandwidth and the second angular bandwidth each comprise a respective full-width-at-half-maximum (FWHM) of incoupling efficiency of the incoupler as a function of angles of incidence relative to the incoupler for the first wavelength and the second wavelength respectively.

12. The WHUD of claim 8, wherein the incoupler comprises at least one of a hologram and a surface relief grating.

13. The WHUD of claim 8, wherein:

the first light is incident upon the spatial modulator at a first angle relative to the spatial modulator; and the second light is incident upon the spatial modulator at a second angle relative to the spatial modulator, the second angle different than the first angle.

14. A wearable heads-up display (WHUD) comprising:

a light source to generate an output light;

a spatial modulator to receive the output light from the light source;

a display optic to receive the output light from the spatial modulator and direct the output light towards an eye of a user of the WHUD to form an image viewable by the user, the display optic comprising an incoupler to direct the output light into the display optic; and a controller in communication with the light source and the spatial modulator, the controller to:

control the light source to generate the output light comprising a first light having a first wavelength and a second light having a second wavelength, the first wavelength being within about 50 nm of the second wavelength;

control the spatial modulator to direct the first light onto the incoupler along a first range of input angles relative to the incoupler, wherein:

the first range of input angles corresponds to positions of pixels of a first portion of the image; and the incoupler has a first angular bandwidth corresponding to the first wavelength and a second angular bandwidth corresponding to the second wavelength;

control the spatial modulator to direct the second light onto the incoupler along a second range of input angles relative to the incoupler, wherein:

the second range of input angles corresponds to positions of pixels of a second portion of the image; and a combination of the first range of input angles and the second range of input angles is larger than the first angular bandwidth and larger than the second angular bandwidth;

wherein to control the spatial modulator to direct the first light and the second light onto the incoupler the controller is to:

control the light source and the spatial modulator to direct the first light onto the incoupler during a first time portion and a second time portion of a sweep time of the spatial modulator; and control the light source and the spatial modulator to direct the second light onto the incoupler during the second time portion and a third time portion of the sweep time of the spatial modulator.

* * * * *